United States Patent
Kwan (10) Patent No.: US 7,958,557 B2
(45) Date of Patent: Jun. 7, 2011

(54) DETERMINING A SOURCE OF MALICIOUS COMPUTER ELEMENT IN A COMPUTER NETWORK

(75) Inventor: Anthony Chiu-Chi Kwan, Victoria (AU)

(73) Assignee: Computer Associates Think, Inc., Islandia, NY (US)

( * ) Notice: Subject to any disclaimer, the term of this patent is extended or adjusted under 35 U.S.C. 154(b) by 1389 days.

(21) Appl. No.: 11/436,751

(22) Filed: May 17, 2006

(65) Prior Publication Data

US 2007/0271611 A1    Nov. 22, 2007

(51) Int. Cl.
G06F 11/00 (2006.01)
G06F 12/14 (2006.01)
G06F 12/16 (2006.01)
G08B 23/00 (2006.01)

(52) U.S. Cl. ............... 726/23; 726/22; 726/24; 726/25
(58) Field of Classification Search ............ 726/22, 726/24

See application file for complete search history.

(56) References Cited

U.S. PATENT DOCUMENTS

| | | | | |
|---|---|---|---|---|
| 6,477,648 B1 * | 11/2002 | Schell et al. | | 726/22 |
| 7,152,105 B2 * | 12/2006 | McClure et al. | | 709/224 |
| 7,672,293 B2 * | 3/2010 | Gooch et al. | | 370/351 |
| 7,752,324 B2 * | 7/2010 | Hamadeh et al. | | 709/230 |
| 2003/0110379 A1 * | 6/2003 | Ylonen et al. | | 713/164 |
| 2005/0177868 A1 | 8/2005 | Kwan | | 726/11 |
| 2005/0182959 A1 * | 8/2005 | Petry et al. | | 713/200 |
| 2006/0015584 A1 * | 1/2006 | Ocko et al. | | 709/219 |
| 2006/0098654 A1 * | 5/2006 | Tingle et al. | | 370/389 |
| 2006/0137009 A1 * | 6/2006 | Chesla | | 726/22 |
| 2006/0184632 A1 * | 8/2006 | Marino et al. | | 709/206 |
| 2006/0184690 A1 * | 8/2006 | Milliken | | 709/238 |
| 2006/0256729 A1 * | 11/2006 | Chen et al. | | 370/250 |
| 2007/0192862 A1 * | 8/2007 | Vermeulen et al. | | 726/23 |
| 2008/0127338 A1 * | 5/2008 | Cho et al. | | 726/22 |
| 2009/0013043 A1 * | 1/2009 | Tan | | 709/205 |

OTHER PUBLICATIONS

Stefan Savage, David, Wetherall, Anna Karlin and Tom Anderson; Practical Network Support for IP Traceback; Year 2000, ACM.*

* cited by examiner

Primary Examiner — Matthew B Smithers
Assistant Examiner — Jing Sims
(74) Attorney, Agent, or Firm — Baker Botts, L.L.P.

(57) ABSTRACT

In certain embodiments, a method for tagging communications from a user system, such that a source of a malicious computer element in a computer network may be determined, includes determining tag information for a user system in the computer network, the tag information physically identifying the user system. The method further includes detecting an attempt to send a communication from the user system and, in response to detecting the attempt to send a communication from the user system, attaching the tag information to the communication prior to sending the communication from the user system. The attachment of the tag information to the communication allows the source of the communication to be determined in response to determining that the communication is associated with a malicious computer element, the source comprising the user system.

86 Claims, 3 Drawing Sheets

| EMAIL | MAC ADDRESS | COMPANY ASSET ID | CURRENT LOGIN USER NAME | DATE AND TIME STAMP |
|---|---|---|---|---|
| EMAIL 1 | 01:2f:21:b1:11:0a | 00417 | JJONES | Thu 06/14/2002 1:01 PM |
| EMAIL 2 | 01:3c:12:a2:11:0b | 00101 | TKWAN | Mon 10/22/2004 7:48 AM |
| EMAIL 3 | 11:e1:12:b3:22:1c | 08365 | MJORDAN | Tue 01/09/2005 4:53 PM |
| ⋮ | ⋮ | ⋮ | ⋮ | ⋮ |
| EMAIL N | 21:1d:12:a2:21:e1 | 04612 | VYOUNG | Fri 07/13/2005 8:58 AM |

DETERMINING A SOURCE OF MALICIOUS COMPUTER ELEMENT IN A COMPUTER NETWORK

TECHNICAL FIELD

The present invention relates generally to computer networks and more particularly to determining a source of a malicious computer element in a computer network.

BACKGROUND

Computer viruses, computer worms, Trojan horses, and other malicious computer elements, also known as malware, are typically a concern for a business enterprise or other suitable entity that operates using a computer network. These malicious computer elements are often distributed throughout the computer network, either knowingly or unknowingly, using an email application or another application that communicates messages over the computer network. For example, a user may knowingly or unknowingly distribute a malicious computer element by sending emails to one or more other users in the enterprise that include the malicious computer element. As another example, due to a malicious computer element, a user system may automatically send emails that propagate the malicious computer element throughout a computer network. These malicious computer elements often fake certain information in communications such that the true source of the communication is hidden or misrepresented. For example, a malicious computer element may alter the "To" and "From" fields in a Multipurpose Internet Mail Extension (MIME) header of emails, such that the true source of the email is hidden or misrepresented.

SUMMARY

According to the present invention, disadvantages and problems associated with previous techniques for determining a source of a malicious computer element in a computer network may be reduced or eliminated.

In certain embodiments, a method for tagging communications from a user system, such that a source of a malicious computer element in a computer network may be determined, includes determining tag information for a user system in the computer network, the tag information physically identifying the user system. The method further includes detecting an attempt to send a communication from the user system and, in response to detecting the attempt to send a communication from the user system, attaching the tag information to the communication prior to sending the communication from the user system. The attachment of the tag information to the communication allows the source of the communication to be determined in response to determining that the communication is associated with a malicious computer element, the source comprising the user system.

In certain embodiments, a method for determining a source of a malicious computer element in a computer network includes receiving a plurality of communications each comprising tag information. The tag information for a communication physically identifies a source of the communication, the source of the communication comprising a user system from which the communication originated. The method further includes: (1) determining, based on one or more of the received communications, that a suspicious event has occurred; (2) determining a communication associated with the suspicious event; and (3) accessing the tag information for the communication associated with the suspicious event to determine the source of the communication.

Particular embodiments of the present invention may provide one or more technical advantages. In certain embodiments, the present invention may improve the ability to determine a source of a malicious computer element (e.g., a computer virus or computer worm) in a computer network. For example, whereas previous and existing techniques for determining a source of a malicious computer element generally rely on information that is unreliable or can be faked in determining a source of a communication (e.g., an email), certain embodiments of the present invention provide the ability to determine the source of a malicious computer element based on tag information that physically identifies the user system from which the communication that includes the malicious computer element was sent. In certain embodiments, the information used to tag communications is at a sufficiently low level that it is difficult or impossible to fake or otherwise bypass, by a malicious computer element or user for example.

In certain embodiments, the ability to accurately identify a source of a malicious computer element in a computer network may facilitate limiting or preventing the spread of the malicious computer element throughout a network and/or otherwise minimize the impact of the malicious computer element in the network. For example, the present invention may allow a network manager or other user to determine a source of a malicious computer element in a computer network, which may ultimately allow the network manager to limit or prevent the spread of the malicious computer element. In certain embodiments, the present invention may allow a network manager or other suitable user to better manage anti-virus installations and provide more information during a malicious computer element outbreak. For example, in certain embodiments, the present invention may allow appropriate action to be taken once a user system that is the source of the malicious computer element is determined. This action may include locking the user system that is the source of a malicious computer element off the computer network, quarantining all communications from the user system that is determined to be the source, or taking other suitable action.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention, and for further features and advantages thereof, reference is now made to the following description, taken in conjunction with the accompanying drawings, in which.

DESCRIPTION OF EXAMPLE EMBODIMENTS

Figure 1:
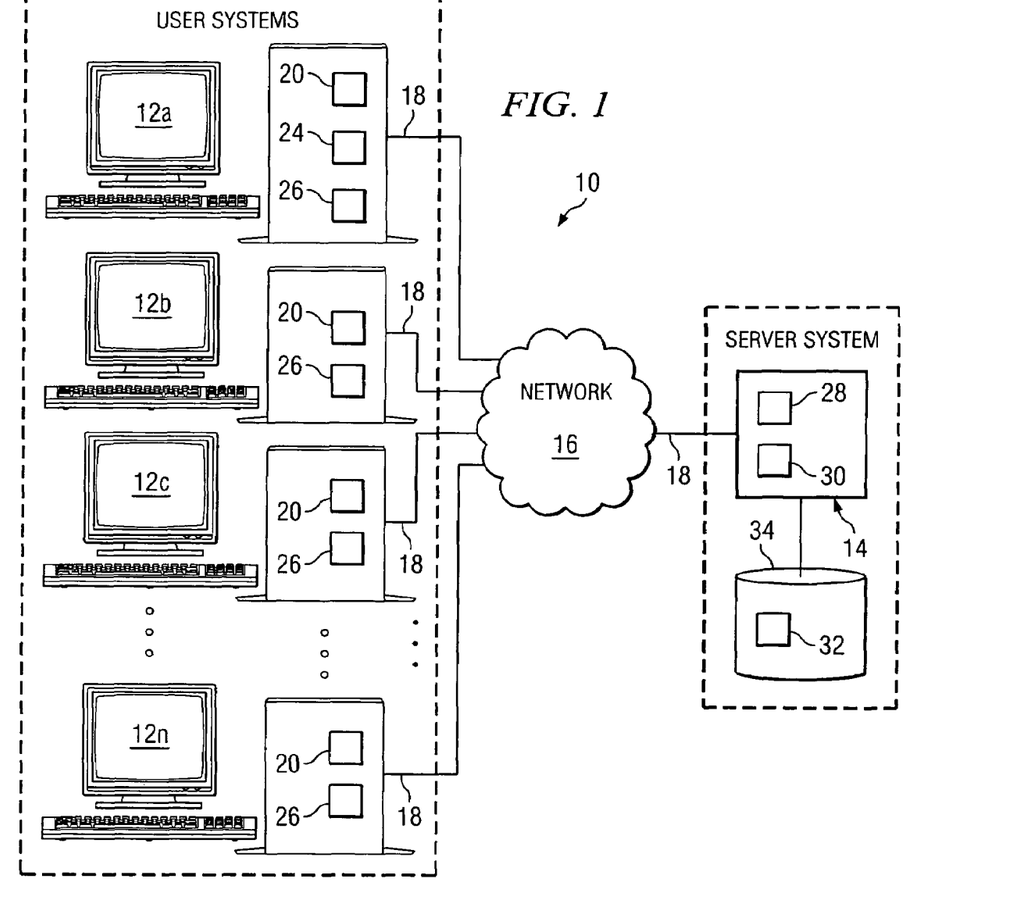
FIG. 1 illustrates an example system for determining a source of a malicious computer element in a computer network.

FIG. 1 illustrates an example system 10 for determining a source of a malicious computer element in a computer network. In certain embodiments, system 10 includes one or more user systems 12, a server system 14, and a network 16. Although this particular implement of system 10 is illustrated and described, the present invention contemplates any suitable system for implementing the present invention. In certain embodiments, the present invention provides the ability to determine a source of a malicious computer element in network 16. Additionally or alternatively, in certain embodiments, the present invention provides the ability to determine whether a suspicious event has occurred in network 16, which may indicate that one or more user systems 12 in network 16 are infected with a malicious computer element.

Each user system 12 may include input devices, output devices, mass storage media, processors, memory, interfaces, communication ports, or other appropriate components for communicating with each other and/or with server system 14. Additionally, each user system 12 may include a personal computer (PC), workstation, network computer, kiosk, wireless data port, personal data assistant (PDA), one or more processors within these or other devices, or any other suitable processing device. As an example, user system 12a may include a computer that includes an input device, such as a keypad, touch screen, mouse, or other device that can accept information, and an output device that conveys information associated with the operation of user system 12a or server system 14, including digital data, visual information, or any other suitable information. Both the input device and output device may include fixed or removable storage media such as a magnetic computer disk, CD-ROM, or other suitable media to both receive input from and provide output to users of client systems 12. User systems 12 may be local to or remote from server system 14. Although a particular number of user systems 12 is illustrated, the present invention contemplates system 10 including any suitable number of user systems 12, according to particular needs. "User system 12" and "user of user system 12" may be used interchangeably throughout this description.

In certain embodiments, user systems 12 may communicate with other user systems 12 and/or server system 14 via network 16 in a client/server or other distributed environment. Although system 10 is primarily described as a client/server environment including one or more user systems 12 and server system 14, this is merely for example purposes; system 10 may include any suitable computing environment according to particular needs. In one embodiment, user systems 12 and server system 14 are local to one another. In another embodiment, one or more user systems 12 are remote from one or more other user systems and/or server system 14.

Network 16 facilitates wireless or wireline communication. Network 16 may communicate, for example, Internet Protocol (IP) packets, Frame Relay frames, Asynchronous Transfer Mode (ATM) cells, voice, video, data, and other suitable information between network addresses. Network 16 may include one or more local area networks (LANs), radio access networks (RANs), metropolitan area networks (MANs), wide area networks (WANs), all or a portion of the global computer network known as the Internet, and/or any other communication system or systems at one or more locations.

User systems 12 and server system 14 may be coupled to network 16 by one or more links 18. Each link 18 may be the same or different and may include any suitable type of link, including for example one or more LANs, RANs, MANs, WANs, all or a portion of a global computer network such as the Internet, or any other wireline, optical, wireless, or other links. Link 16 may communicate, for example, IP packets, Frame Relay frames, ATM cells, voice, video, data, and other suitable information between network addresses.

Server system 14 includes one or more electronic computing devices operable to receive, transmit, process, and store data associated with system 10. For example, server system 14 may include one or more general-purpose PCs, Macintoshes, workstations, Unix-based computers, server computers, or any other suitable devices. In one embodiment, server system 14 includes a web server. In short, server system 14 may include any suitable combination of software, firmware, hardware, and any other suitable components. In certain embodiments, server system 14 comprises an email server, which may or may not be a part of a larger server system. Although a single server system 14 is illustrated, the present invention contemplates system 10 including any suitable number of server system 14.

FIG. 1 merely provides one example of computers that may be used with the invention. For example, although FIG. 1 provides one example of server system 14 that may be used with the present invention, system 10 may be implemented using computers other than servers, as well as a server pool. The present invention contemplates computers other than general purpose computers as well as computers without conventional operating systems. As used in this document, the term "computer" is intended to encompass a personal computer, workstation, network computer, a portable computing device, or any other suitable processing device.

Each user system 12 may include one or more applications 20 operable to send and/or receive communications. In certain embodiments, the communications comprise emails and application 20 comprises an application for sending and receiving emails, such as MICROSOFT OUTLOOK, NOVELL GROUPWISE, or any other suitable email application. Although applications 20 are primarily described as email applications, the present invention contemplates applications 20 being any suitable types of applications that may receive and/or send communications. Depending on the type of application 20, the communications sent an application 20 may include any type of data sent and received by computers and applications 20.

Throughout the remainder of this description, application 20 will be referred to as email application 20 and the communications will be primarily referred to as emails. However, it should be understood that the present invention is not intended to be so limited. For example, application 20 may be operable to query a database associated with system 10, and the communications may comprise structured query language (SQL) queries for example. As another example, application 20 may comprise a client-server application, and the communications may include communications between client processes and server processes of application 20.

One or more of user systems 12 may become infected with a malicious computer element 24. While FIG. 1 merely shows user system 12a as including malicious computer element 24, the present invention contemplates any suitable number of user systems 12 including a malicious computer element 24

(including zero) at any given time. In certain embodiments, a malicious computer element comprises a type of software, typically referred to as "malware," designed to take over and/or damage a computer user's operating system or other component of a computer system and/or computer network, often without the user's knowledge or authorization. For example, a malicious computer element may include a computer virus, a computer worm, a Trojan horse, a wabbit, a backdoor, spyware, a key logger, a dialer, a browser hijacker, or any other suitable type of malware. Malicious computer elements may spread through network 16 in communications, such as emails, sent throughout network 16, by users of user systems 12 for example. These malicious computer elements may even cause user systems 12 to automatically send infected communications throughout network 16.

In certain embodiments, malicious computer element 24 may include a computer worm, which typically includes a self-replicating computer program, similar to a computer virus. A virus typically attaches itself to and becomes part of another executable program. A worm, on the other hand, typically is self-contained and does not need to be a part of another program to propagate itself. In certain embodiments, worms are designed to exploit the file transmission capabilities of a computer (e.g., email capabilities). Infected user systems 12 may, intentionally or unintentionally, distribute malicious computer element 24 to other user systems 12 and/or server system 14 through communications, such as emails sent using email application 20.

When a gateway virus scanner, which may be running on a server system such as server system 14 for example, determines that malicious computer element 24 is present in a network (e.g., by determining that a received email includes a virus), the gateway virus scanner may have access to the malicious computer element 24 and its associated email. The email typically includes certain sender address information. For example, the network manager may access a suspicious email by accessing a header of the email (e.g., a MIME header of the email), particularly the "From" field, to determine who sent the email. While this information may lead to the appropriate sending user system 12 in some circumstances, the MIME fields (or fields of another header type) of an email (e.g., "To" and "From") may be faked and often are faked by typical malicious computer elements 24. As another example, it may be possible to associate the Internet Protocol (IP) address of the sending user system 12 of an email with the email. Again, while this may allow the correct sending user system 12 to be determined in some situations, many computer networks do not use static IP addresses, but instead allocate IP addresses dynamically. This may make it difficult or impossible to determine with any certainty the sending user system 12 of an email based on the IP address associated with the email at the time it was sent. Thus, current techniques make it difficult to determine with any certainty a source of a malicious computer element in a computer network because the information included in communications from an infected user system 12 are often unreliable.

According to certain embodiments of the present invention, on the other hand, one or more user systems 12 each include a tagging module 26 that is operable to tag communications sent from its corresponding user system 12 with tag information, at least a portion of which physically identifies one or more components of the source of the communication. In certain embodiments, the source of a communication comprises the user system 12 from which the communication originated.

Tagging module 26 may monitor its corresponding user system 12 for attempts to send communications to one or more other user systems 12, server system 14, and/or any other suitable destination. In embodiments in which the communications comprise emails, for example, tagging module 26 monitors email traffic of user system 12 for attempts to send emails to one or more other user systems 12, server system 14, and/or any other suitable destination. As a particular example, tagging module 26 may monitor simple mail transfer protocol (SMTP) traffic of user system 12 for attempts to send email to one or more other user systems 12, server system 14, and/or any other suitable destination. Tagging module 26 may be implemented using any suitable combination of software, hardware, firmware, or any other suitable components. Tagging module 26 may comprise, for example, a software hook in the transmission control protocol (TCP)/IP or other suitable communication protocol of user system 12, monitoring SMTP protocol traffic for attempts to send emails. While monitoring of SMTP traffic for attempts to send emails is primarily described, the present invention contemplates monitoring for email traffic in any suitable manner, according to particular needs.

In response to detection of an attempt to send an email from user system 12, tagging module 26 may access tag information for user system 12, the tag information including information physically identifying one or more components of the user system 12 from which the email is being sent, and attach the tag information to the email. For example, if a user of user system 12a attempts to send an email from user system 12a, tagging module 26 of user system 12a may detect the attempt to send the email, access the tag information physically identifying one or more components of user system 12a, and attach the tag information to the email. The tag information may be stored in a single location on user system 12 or otherwise accessible to tagging module 26, or may be accessed in any other manner, according to particular needs.

Tag information for a communication may include any suitable information for identifying the source of the communication (e.g., the user system 12 from which the communication is being sent), at least a portion of the tag information physically identifying one or more components of the source user system 12. In certain embodiments, tag information includes information that is independent of the information included in a communication by the application 20 used to send the communication (e.g., the "To" and "From" fields of the MIME header of the email). For example, while the information included in an email by email application 20 may generally be faked or otherwise altered by malicious computer element 24, at least a portion of tag information may be difficult if not impossible to fake by malicious computer element 24.

The tag information may include, for example, a network interface card (NIC) address, a company asset identifier of user system 12, a company asset identifier of a component of user system 12, a current login username, a date and time stamp, an anti-virus status of user system 12, and any other suitable information according to particular needs. Each of these examples is described in more detail below.

In certain embodiments, a NIC comprises a card that plugs into a motherboard of user system 12 and provides a port for connecting user system 12 to one or more networks, such as network 16. A NIC address may include, for example, a media access control (MAC) address or an Ethernet card address. A company asset identifier may include an identification number or other identifier unique to the user system 12 and assigned by a company, such as the company with which the user of system 12 is employed. The company asset identifier may be encoded in hardware, software, or firmware of user system 12. A company asset identifier of a component of user system 12 may include an identification number or other identifier unique to a component of user system 12. This identifier may be assigned by a manufacturer of the component or by any other suitable entity. The component may include any suitable component of user system 12. The current login username may include the username of the user currently logged in using user system 12.

A date and time stamp may include the date and time at which the communication was sent. Typically, email application 20 is operable to attach a date and time to an email when the email is sent. This date and time information may be included in the MIME header of the email, for example. Certain malicious computer elements 24 may have the ability to fake the date and time attached by email application 20. In certain embodiments, the date and time stamp attached by tagging module 26 may include the system date and time maintained by user system 12 (e.g., the date and time maintained by the BIOS of user system 12), which may be difficult or impossible to fake. Thus, the date and time stamp attached by tagging module 26 may be independent of the date and time stamp attached by email application 20. While certain of the tag information may comprise information physically identifying the user system 12, the present invention contemplates tag information include other information. For example, an anti-virus status may include one or more flags or identifiers indicating whether user system 12 is infected, whether user system 12 has been scanned within a predetermined time period for virus infection, or any other suitable information.

In certain embodiments, tagging module 26 may attach the tag information to the communication by adding the tag information to a header of the communication. The tag information may take the form of a single value, a string of values merged together, multiple fields in a header of the communication, or may be formatted in any other suitable manner according to particular needs. For example, in embodiments in which the communication comprises an email, tagging module 26 may add tag information to a header of the email, such as the MIME header of the email.

Thus, in certain embodiments, some or all of the communications sent from user systems 12 include tag information that physically identifies one or more components of the user system 12 from which the communication was sent. This tag information may be used to determine the source of a communication and may be more reliable than information included in a communication by an application 20 that is used to generate the communication.

Server system 14 may receive communications (e.g., emails) sent by user systems 12, via network 16 and links 18 for example. Communications (e.g., emails) sent by user systems 12 may be routed through or otherwise intercepted by server system 14. In certain embodiments, server system 14 includes an email server application 28. Among other functions, email server application 28 may be operable to receive and route emails received from user systems 12. For example, email server application 28 may receive incoming email from local and remote user systems 12 and forward outgoing email for delivery. As particular examples, email server application 28 may include, without limitation, MICROSOFT EXCHANGE, QMAIL, EXIM, SENDMAIL, or any other suitable email server application according to particular needs. Email server application 28 may be a part of a larger messaging system for facilitating the receipt and delivery of email. The present invention contemplates system 10 including any suitable messaging system, according to particular needs.

In certain embodiments, server system 14 includes an analysis application 30, which is operable to analyze emails (or other communications) routed through server system 14. For example, analysis application 30 may interact with email server application 28 to facilitate the analysis of emails communicated through server system 14. In certain embodiments, analysis application 30 may include anti-virus capabilities. For example, analysis application 30 may include a gateway virus scanner. However, the present invention contemplates anti-virus capabilities being provided by another application, if appropriate. Communications received by server system 14 include tag information identifying the source of the communication (i.e., the user system 12 from which the communication originated). As will be described in more detail below, analysis application 30 may use the tag information of a communication in analyzing the communication.

Email server application 28 and analysis application 30 may each comprise any suitable combination of software, firmware, or hardware. Additionally, although email server application 28 and analysis application 30 are described as separate, the present invention contemplates email server application 28 and analysis application 30 being separate or combined, in whole or in part, according to particular needs.

In certain embodiments, server system 14 may store one or more of received communications and associated tag information as source information 32 in a database or other suitable memory module 34. For example, email server application 28, analysis application 30, or another suitable component of server system 14 may store received emails and associated tag information as source information 32 in memory module 34. Memory module 34 may include any memory or database module and may take the form of volatile or non-volatile memory including, without limitation, magnetic media, optical media, random access memory (RAM), read-only memory (ROM), removable media, or any other suitable local or memory component. In particular embodiments, memory module 34 includes one or more structured query language (SQL) servers. Moreover, although a single memory module 34 is illustrated, the present invention contemplates system 10 including any suitable number of memory modules 34 according to particular needs.

Analysis application 30 or another suitable component of server system 14 may use the tag information to determine the source of a communication. As described below, this capability may be used for a variety of reasons. For example, in response to determining that a particular communication is associated with a malicious computer element 24 or in response to determining that a particular user system 12 is associated with a malicious computer element 24, analysis application 30 may determine the source of the communication. As another example, analysis application 30 may determine the source of a communication in order to facilitate a determination of whether a user system 12 is infected with a malicious computer element 24 (e.g., to determine whether a detected suspicious event actually means that an associated user system 12 is infected with a malicious computer element 24, as described below).

Detection of whether a user system 12 is infected with a malicious computer element may be performed using a variety of techniques. Analysis application 30 or another suitable component of system 10 may determine whether a malicious computer element 24 is associated with a user system 12. Although particular examples of how it may be determined that a malicious computer element 24 is associated with one or more user systems 12 are described below, the present invention contemplates doing so in any suitable manner.

In certain embodiments, one or more of user systems 12, server system 14, or another suitable component of system 10 may include an anti-virus program that may identify infected emails. For example, an anti-virus program running on user system 12 may determine that the user system 12 is infected with one or more malicious computer elements 24. In certain embodiments, this anti-virus status (e.g., infected) may be included in tag information or otherwise communicated with emails from user system 12. As another example, an anti-virus program running on server system 14 (e.g., a gateway anti-virus program) may determine that a received email is infected with a malicious computer element 24.

In certain embodiments, the analysis performed by analysis application 30 facilitates discovery of a suspicious event that may indicate that one or more user systems 12 are infected with a malicious computer element. For example, analysis application 20 may analyze emails received by server system 14 (e.g., emails routed through server system 14) to determine whether a suspicious event has occurred that may indicate that one or more user systems 12 are infected with a malicious computer element.

In certain embodiments, in order to determine whether a suspicious event has occurred, server system 14 (e.g., using analysis application 30) may analyze received emails to determine whether a suspicious event has occurred. Analysis application 30 may analyze emails as they are received from user systems 12, on a scheduled basis, or at any other suitable time according to particular needs. In some cases, analysis application may simply conclude that a user system 12 is infected with a malicious computer element 24 based on the type of suspicious event detected. In other cases, additional investigation may be performed to determine whether or not a suspicious event was actually caused by a malicious computer element 24.

Suspicious events may be determined in any suitable manner and may include any suitable circumstances. As a first example, a suspicious event may include a particular user system 12 sending a threshold number of emails within a specified period of time. As a particular example, if a particular user system 12 sends more than twenty emails within a five minute period of time, this may be considered a suspicious event. As a second example, a suspicious event may include a file size of an email exceeding a threshold file size. As a particular example, if the file size of an email exceeds fifty megabytes, this may be considered a suspicious event. As a third example, a suspicious event may include an email including a particular combination of recipient addresses. As a particular example, it may be rare for an email to specify both the CEO of a company and certain other employees. An email that specifies both may be an email generated automatically by a computer worm that is sent to all employees of the company. As a fourth example, a suspicious event may include an email specifying a threshold number of recipients. As a particular example, an email specifying more than one hundred recipient addresses may be considered a suspicious event.

As a fifth example, a suspicious event may include emails being sent from a single user system 12 using different identities. As a particular example, if a first email from a user system 12a identifies a first sender address and a second email from user system 12a identifies a second sender address that is different from the first sender address, this may be considered a suspicious event. As a sixth example, a suspicious event may include multiple user systems 12 sending out emails with the same sender address information. As a particular example, if a user system 12a and user system 12b both send emails that include the same sender address information, that may be considered a suspicious event. As a seventh example, a suspicious event may include receiving an email at server system 14 that lacks attached tag information. As a particular example, if an email is received that does include any attached tag information, that may be considered a suspicious event because it may be assumed that all emails that are properly sent within system 10 should include the attached tag information.

In certain embodiments, one or more of these or other suspicious events may indicate that the sending user system 12 has been infected by a computer virus, computer worm, or other type of malicious computer element. Although certain example suspicious events have been described above, the present invention contemplates any suitable suspicious events that may indicate that one or more user systems 12 are infected with a malicious computer element.

In certain embodiments, in addition to or instead of relying on information associated with the email by the application 20 used to send the email (e.g., "To" or "From" header information), analysis application 30 may use tag information when determining whether a suspicious event has occurred. Examples of how tag information may be used with respect to the above-described example suspicious events will now be described. For example, to determine whether a particular user system 12 has sent a threshold number of emails within a specified period of time, it may be preferable to rely on the tag information identifying the sources of emails rather than the sender address information specified in the emails. As another example, to determine whether emails are being sent from a single user system 12 using different identities, it may be preferable to rely on the tag information identifying the sources of the emails rather than on the sender address information included in the email. As another example, to determine whether multiple user systems 12 have sent out emails with the same sender address information, it may be preferable to rely on the tag information identifying the sources of the emails rather than the sender address information specified in the emails. Although particular examples of using tag information to determine whether certain example suspicious events have occurred are described, the present invention contemplates using tag information in any suitable way to determine whether any suitable suspicious events have occurred, according to particular needs.

Server system 14 may use tag information in a variety of ways. In certain embodiments, server system 14 may use tag information to determine the source of a malicious computer element 24. For example, once server system 14 determines that a malicious computer element 24 is associated with a particular email, server system 14 may determine the source of the email using tag information. Additionally or alternatively, in certain embodiments, server system 14 may use tag information to determine whether a malicious computer element 24 is associated with a user system 12. For example, as described above, server system 14 (e.g., analysis application 30 of server system 14) may determine that a suspicious event has occurred and then, using source information 32, investigate the source of the suspicious event to determine whether the source (e.g., user system 12) is infected with a malicious computer element 24. In such embodiments, source information 32 may be used to determine both that a malicious computer element 24 is associated with a user system 12 (e.g., that a suspicious event was the result of a malicious computer element 24) and the source of the malicious computer element 24. For example, based on the analysis of received emails, analysis application 30 may determine that a suspicious event has occurred. However, not all suspicious events necessarily indicate that a user system 12 has been infected with a malicious computer element 24. Source information 32 (e.g., tag information) may allow analysis application 30 to determine the source of a communication associated with the detected suspicious event and investigate further to determine if the suspicious event was caused by a malicious computer element 24. In certain embodiments, it may be assumed that all suspicious events are caused by a malicious computer element 24.

As described above, the tag information attached to emails by tagging modules 26 at user systems 12 may allow a suitable component of server system 14 to determine the source of the e-mail. The source of the e-mail may include the user system 12 from which the e-mail originated, which may allow the true physical source of the email to be determined. For example, if analysis module 30 determines that a particular email is associated with a suspicious event, analysis module 30 or another suitable component of server system 14 may determine the source of the email based on the tagging information attached to the particular email. As another example, if analysis module determines that a particular email is associated with a malicious computer element 24, analysis module 30 or another suitable component of server system 14 may determine the source of the email based on the tag information attached to the particular email.

In response to determining that one or more user systems 12 are infected with a malicious computer element 24 and/or that a suspicious event has occurred and the source of the malicious computer element 24, appropriate action may be taken. For example, a determination may be made, either automatically or with human intervention, as to whether a suspicious event actually resulted from a malicious computer element 24 (e.g., whether the source user system 12 is infected with a malicious computer element 24). This may include manually accessing the source user system 12 of the email to determine whether the user system 12 is infected. The appropriate action may include termination, either permanently or temporarily, of the infected user system 12's access to network 16. For example, the infected user system 12 may be blocked from accessing network 16 until it can be determined that the virus or other malware has been removed from the infected user system 12. Alternatively, the appropriate action may include quarantining all emails sent by a user system 12 determined to be infected. Although particular example actions are described, the present invention contemplates any suitable action in response to a determination that a user system 12 is infected.

In operation of an example embodiment of system 10, suppose application 20 comprises an email application, communications sent by user system 12*a* comprise emails, server system 14 comprises an email server system 14, and user system 12*a* is infected with a malicious computer element 24. For purposes of this example, it will be assumed that malicious computer element 24 comprises a computer worm. User system 12*a* may attempt to send an email to another user system 12. Tagging module 26 of user system 12*a* may detect the attempt to send the email, access tag information for user system 12*a*, and tag the email with the tag information for user system 12*a*. For example, tagging module 22 may attach the MAC address of user system 12*a*, along with any other suitable tag information, to a header of the email. The email, along with the attached tag information, may then be sent to server system 14 for routing to the appropriate one or more recipient user systems 12.

Server system 14 may receive the email originating from user system 12*a*. For example, email server application 28 may receive and process the email. Analysis application 30 may access the received email and store any suitable information. For example, analysis application 30 may receive and store one or more of the email, the tag information attached to the email, and any other suitable information, as source information 32. Analysis application 30 or another suitable component of system 10 may determine that the email is associated with malicious computer element 24 or that the user system 12 that is the source of the email is associated with malicious computer element 24, and may take appropriate action. Analysis application 30 may determine the source of the email using source information 32 to identify the user system 12 from which the email originated (i.e., user system 12*a*). Analysis application 30 may take appropriate action. For example, analysis application 30 may lock user system 12*a* from sending emails on network 16 until the malicious computer element 24 is removed from user system 12*a*.

Particular embodiments of the present invention may provide one or more technical advantages. In certain embodiments, the present invention may improve the ability to determine a source of a malicious computer element 24 (e.g., a computer virus or computer worm) in a computer network. For example, whereas previous and existing techniques for determining a source of a malicious computer element 24 generally rely on information that is unreliable or can be faked in determining a source of a communication (e.g., an email), certain embodiments of the present invention provide the ability to determine a source of a malicious computer element 24 based on tag information that physically identifies the user system 12 from which the communication that includes the malicious computer element 12 was sent. In certain embodiments, the information used to tag communications is at a sufficiently low level that it is difficult or impossible to fake or otherwise bypass, by a malicious computer element 24 or user for example.

In certain embodiments, the ability to accurately identify a source of a malicious computer element 24 in a computer network may facilitate limiting or preventing the spread of the malicious computer element 24 throughout a network and/or otherwise minimize the impact of the malicious computer element 24 in the network. For example, the present invention may allow a network manager or other user to determine a source of a malicious computer element 24 in a computer network, which may ultimately allow the network manager to limit or prevent the spread of the malicious computer element 24. In certain embodiments, the present invention may allow a network manager or other suitable user to better manage anti-virus installations and provide more information during a malicious computer element outbreak. For example, in certain embodiments, the present invention may allow appropriate action to be taken once a user system 12 that is the source of the malicious computer element 24 is determined. This action may include locking the user system 12 that is the source of a malicious computer element 24 off the computer network, quarantining all communications from the user system 12 that is determined to be the source, or taking any other suitable action.

Figure 2:
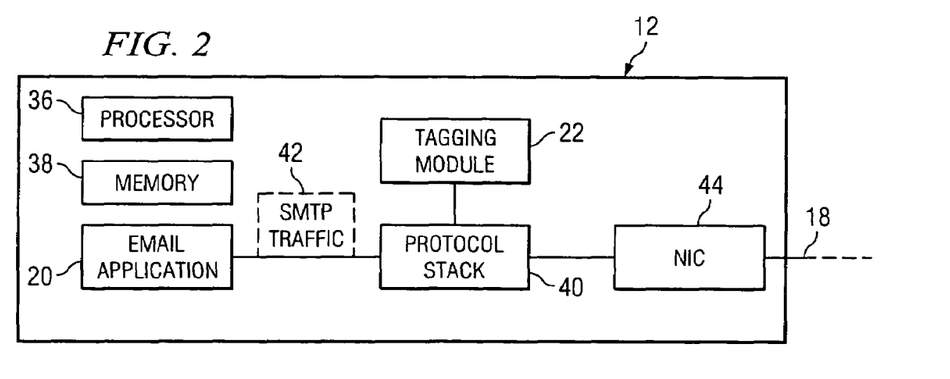
FIG. 2 illustrates an example user system in further detail according to an example embodiment of the present invention.

FIG. 2 illustrates an example user system 12 in further detail according to an example embodiment of the present invention. It should be understood that FIG. 2 illustrates merely one non-limiting example of user system 12. While the example embodiment of user system 12 illustrated FIG. 2 shows the various components of user system 12 being collocated, the present invention contemplates the components of user system 12 being remotely located, according to particular needs. Additionally, it should be appreciated that for ease of illustration and description, the various functional components of user system 12 have been divided as illustrated; however, the present invention contemplates any of the functional components being combined or further partitioned, according to particular needs.

User system 12 includes a processor 36 and a memory 38. Processor 36 executes instructions and manipulates data to perform the operations of user system 12. Although FIG. 2 illustrates a single processor 36 of user system 12, multiple processors 36 may be used according to particular needs, and reference to processor 36 is meant to include multiple processors 36, if appropriate.

Memory 38 may include any memory or database module and may take the form of volatile or non-volatile memory including, without limitation, magnetic media, optical media, RAM, ROM, removable media, or any other suitable local or memory component. In particular embodiments, memory 38 includes one or more SQL servers. Moreover, although a single memory 38 is illustrated, the present invention contemplates system 10 including any suitable number of memories 38 according to particular needs.

User system 12 comprises email application 20. As described above, email application 20 may include MICROSOFT OUTLOOK, NOVELL GROUPWISE, or any other suitable email application. User system 12 may communicate emails using email application 20. For example, a user of user system 12 may interact with email application 20 to send and receive emails. As another example, one or more applications of user system 12 may interact with email application 20 to send and receive emails.

In certain embodiments, user system 12 includes a communication protocol stack 40 that implements the one or more protocols user system 12 uses to communicate with network 16 via link 18. For example, communication protocol stack 40 may include the TCP/IP suite ("TCP/IP stack"). In embodiments in which communication protocol stack 40 comprises a TCP/IP stack, the TCP/IP stack may include, for example, a number of layers. In certain embodiments, one of the layers comprises what is typically referred to as the "application layer" or "layer 7." The application layer of protocol stack 40 may implement one or more of the following protocols: hypertext transfer protocol (HTTP), SMTP, simple network management protocol (SNMP), file transfer protocol (FTP), Telnet, Secure Shell (SSH) and Service Control Protocol (SCP), network file system (NFS), domain name service (DNS), border gateway protocol (BGP), routing information protocol (RIP), or any other suitable protocol according to particular needs. In certain embodiments, SMTP is used for transmission of emails, although the present invention is not intended to be so limited. For example, emails may be communicated as SMTP traffic 42.

User system 12 may include one or more NICs 44 or other suitable network adapters that allows user system 12 to connect to one or more networks, such as network 16. In certain embodiments, NIC 44 comprises a card that plugs into a motherboard of user system 12 and provides a port for connecting user system 12 to one or more networks, such as network 16.

In certain embodiments, as described above, user system 12 may include tagging module 22, which is operable to tag communications sent from user system 12 by attaching tag information to the communications such that the source of the communications (i.e., user system 12) can be determined. For example, in the embodiment of user system 12 illustrated in FIG. 2, tagging module 22 is operable to monitor SMTP traffic 42 for attempts to send an email, and when an attempt to send an email is detected, attach tag information to the email prior to user system 12 sending the email. In certain embodiments, tagging module 22 comprises a software hook in the protocol stack 40 of user system 12, although the present invention is not intended to be limited to such embodiments.

Figure 3:
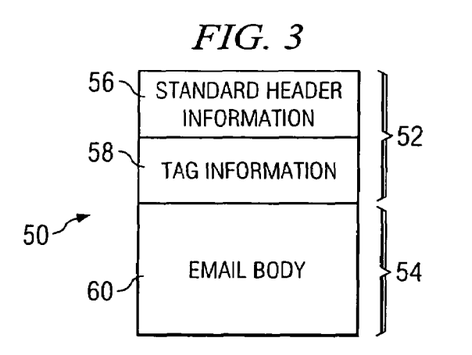
FIG. 3 illustrates an example email communication to which tag information has been attached according to certain embodiments of the present invention.

FIG. 3 illustrates an example email communication 50 to which tag information has been attached according to certain embodiments of the present invention. Although an email communication is primarily described, the present invention contemplates any suitable type of communication being sent from user system 12. Additionally, it should be understood that FIG. 3 illustrates merely one non-limiting example of an email communication 50.

Email communication 50 includes a header portion 52 and a body portion 54. Typically, emails include header portion 52, which may include information about the email such as the sender address, the recipient address, the date and time of the email, a subject line, and any other suitable information. Email communication 50 includes such information as standard header information 56. In addition, email communication 50 includes tag information 58, which may be attached to email communication 50 by a tagging module 22 associated with the user system 12 that generated email communication 50. As described above, tag information 58 identifies the source of the email communication 50, the source being the user system 12 that generated email communication 50. In certain embodiments, tag information 58 includes at least a portion that physically identifies one or more components of the source of email communication 50. Email communication 50 may also include body portion 54 which may include the email body 60. Email body 60 includes the substantive text of the email, along with any other suitable information.

Figure 4:
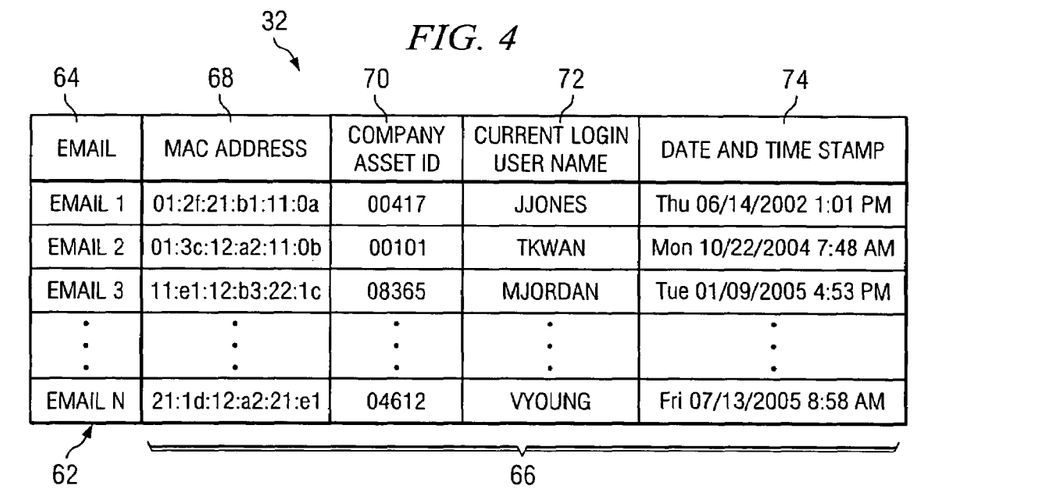
FIG. 4 illustrates an example format of source information according to certain embodiments of the present invention.

FIG. 4 illustrates an example format of source information 32 according to certain embodiments of the present invention. In certain embodiments, source information 32 is stored in a tagging information table 62, which may be stored in memory module 34 by a suitable component of server system 14, such as analysis application 30. Although tagging information table 62 is referred to primarily in the singular, the present invention contemplates source information 32 being stored in any suitable number of tables, according to particular needs.

As described above, source information 32 includes tag information of received communications, and may also include the communications themselves (in any suitable format). In the illustrated example, tagging information table 62 stores emails 64 and their attached tag information. For example, as server system 14 receives emails communicated by user systems 12, a suitable component of system 10 may store some or all of the emails 64, along with the corresponding tag information 66, in tagging information table 62. Emails 64 may include the actual emails received by server system 14 from user system 12, portions of the emails, or references to the emails for example.

Tag information 66 includes information that physically identifies one or more components of the source of the email 64 to which the tag information 66 is attached. In certain embodiments, tag information 66 includes a network adapter identifier 68, a company asset identifier 70, a current login username 72, and a date and time stamp 50.

It should be understood that emails 64 and the various tag information 66 are arranged in separate columns of tagging information table 62 for illustrative purposes only, and that the contents of emails 64 and tag information 66 may be formatted or configured in any manner. Although a single table 62 is illustrated, the present invention contemplates tagging information table 62 comprising any suitable number of tables, according to particular needs. In certain embodiments in which multiple tables 62 are used, each table 62 may be dedicated to a particular user system 12 (e.g., based on tagging information 66 for that user system 12, such as the MAC address), to a particular domain of system 10, or to any other suitable division of table 62. Additionally, the information in tagging information table 62 may be sorted in any suitable manner, according to particular needs. As just one example, the information in table 62 may be sorted by MAC address.

Although tagging information table 62 is described as one technique for storing tag information 66 in association with emails 64, the present invention contemplates storing one or more of emails 64 and tag information 66 in any suitable manner, according to particular needs. Additionally or alternatively, some or all of tag information 66 may be combined as a single identifier in which different fields of the identifier represent different portions of tag information 66.

Figure 5:
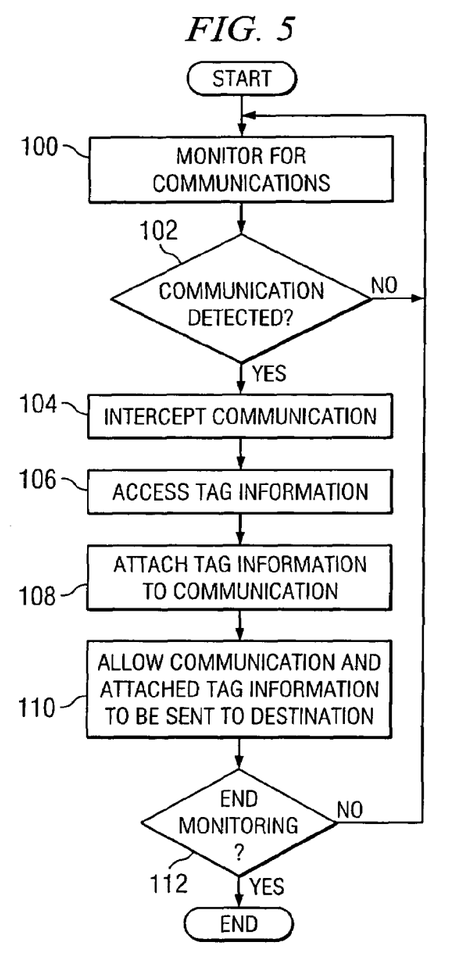
FIG. 5 illustrates an example method for attaching tag information to a communication such that a source of a malicious computer element in a computer network may be determined.

FIG. 5 illustrates an example method for attaching tag information 58 to a communication such that a source of a malicious computer element 24 in a computer network may be determined. At step 100, a suitable component of user system 12 monitors user system 12 for communications being sent from user system 12. For example, tagging module 26 may monitor user system 12 for communications being sent from user system 12. In embodiments in which the communications comprise emails, for example, tagging module 26 may comprise a software hook in the communication protocol stack 40 (e.g., the TCP/IP stack) of user system 12 and may monitor SMTP or other suitable traffic for emails.

At step 102, tagging module 26 or another suitable component of server system 14 may determine whether an attempt to send a communication has been detected. For example, a user of user system 12 may interact with email application 20 to send an email from user system 12, and tagging module 26, which is monitoring SMTP traffic for email communication, may detect that user system 12 is attempting to send an email. If tagging module 26 determines at step 102 that no communication has been detected, tagging module 26 may return to step 100 to continue monitoring user system 12 for communications. If tagging module 26 determines at step 102 that a communication has been detected, then at step 104, tagging module 26 may intercept the communication. In certain embodiments, intercepting the communication may include preventing the communication from being sent from user system 12 until some action is performed, such as attaching tag information 58 to the communication.

At step 106, tagging module 26 may access tag information 58 for user system 12. The present invention contemplates tagging module 26 accessing tag information 58 for user system 12 in any suitable manner, according to particular needs. As a particular example, some or all of tag information 58 may be stored in memory 38 of user system 12, and tagging module 26 may access memory 38 to access tag information 58. As another example, tag information 58 may include an address of a network adapter, such as a NIC, that may be stored on the network adapter (e.g., NIC), and tagging module 26 may access the network adapter (e.g., NIC) to determine the address of the NIC (e.g., the MAC address). As described above, tag information 58 may include information physically identifying one or more components of user system 12. Moreover, while reference to tag information 58 is primarily described for purposes of this example method, the present invention contemplates any suitable tag information in accordance with the present description.

At step 108, tagging module 26 may attach the accessed tag information 58 to the communication. For example, tagging module 26 may attach the accessed tag information 58 to a communication by adding the accessed tag information 58 to a header of the communication. As a particular example, if the communication comprises an email (e.g., email communication 50), tagging module 26 may add the accessed tag information 58 to a header 52 of the email. At step 110, tagging module 26 or another suitable component of user system 12 may allow the communication to be sent from user system 12. For example, tagging module 26 or another suitable component of user system 12 may allow the communication to be sent after tag information 58 is attached to the communication.

At step 112, a determination is made regarding whether to end monitoring user system 12 for attempts to send communications. For example, if user system 12 is shut down, if user system 12 is disconnected from network 16, or if application 20 is terminated, it may be determined that monitoring should be disabled. If it is determined at step 112 that monitoring should be ended, then the method ends. If it is determined at step 112 that monitoring should not be ended, then the method may return to step 100 for tagging module 26 to continue monitoring user system 12 for attempts to send communications.

Figure 6:
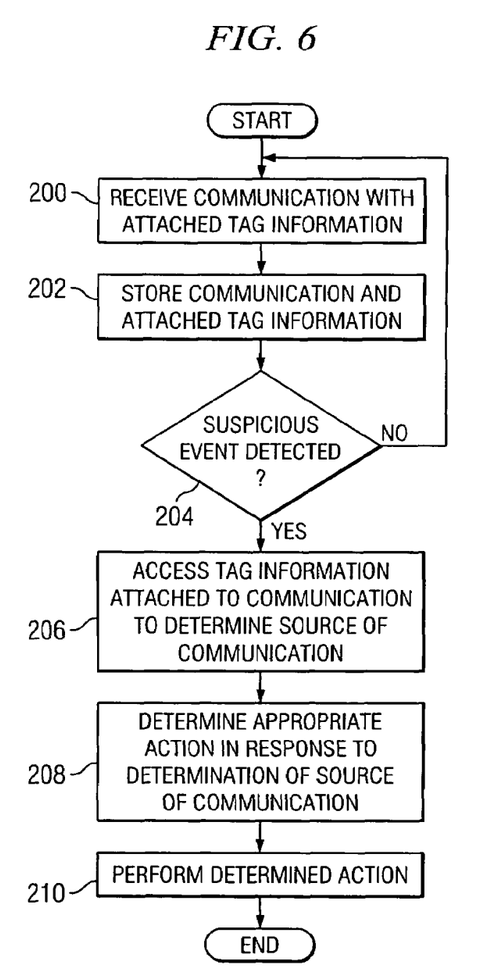
FIG. 6 illustrates an example method for detecting a malicious computer element in a computer network and determining the source of the malicious computer element.

FIG. 6 illustrates an example method for detecting a malicious computer element 24 in a computer network and determining the source of the malicious computer element 24 in a computer network. At step 200, server system 14 receives a communication from a user system 12, the communication including attached tag information 58. For example, email server application 28 of server system 14 may receive the communication from the user system 12. While reference to tag information 58 is primarily described for purposes of this example method, the present invention contemplates any suitable tag information in accordance with the present description. At step 202, server system 14 may store one or more of the communication and its attached tag information as source information 32. For example, analysis application 30 may store the received communication into its attached tag information 58 as source information 32 in memory module 34.

At step 204, a suitable component of server system 14 (e.g., analysis application 30) may determine whether the received communication is associated with a suspicious event. For example, a suitable component of server system 14 may be monitoring received communications for the occurrence of a suspicious event. As an example, server system 14 may receive communication, such as emails, from user systems 12 and monitor the received communications for the occurrence of a suspicious event. In certain embodiments, one or more applications of server system 14, such as email server application 28 and analysis application 30, are operable to either alone or in combination receive and analyze communications received from user systems 12.

A suspicious event may include, for example, any event that may indicate that one or more user systems 12 may be infected with a malicious computer element 24, such as a computer virus, computer worm, or other type of malware. In certain embodiments, server system 14 (e.g., analysis application 30) may use tag information 58 attached to communications received from user systems 12 in determining whether a suspicious event has occurred. In certain embodiments, analysis application 30 may analyze every communication received from user systems 12 for a suspicious event. Additionally or alternatively, server system may analyze a subset of the communications received from user systems 12. Moreover, the communications received from user systems 12 may be analyzed in substantially real time (i.e., as the communications are received) or at any other suitable interval according to particular needs.

If analysis application 30 does not detect a suspicious event at step 204, then server system 14 may return to step 200 and continue to receive communications from user systems 12 and to monitor those communications for suspicious events. If analysis application 30 detects a suspicious event at step 204, then at step 206 analysis application 30 may access tag information 58 that was attached to the communication to determine the source of the communication. For example, analysis application 30 may, in response to detecting to a suspicious event, determine a communication associated with the suspicious event and access source information 32 to determine the tag information 58 associated with the communication, which may be used to determine the source of the communication. As a particular example, analysis application 30 may determine that server system 14 has received emails associated with particular tag information 58 (e.g., a particular MAC address) and that one or more of the emails specify different sender information (e.g., "From" information) in the MIME header of the emails. This may indicate that the user system 12 associated with the tag information 58 (i.e., the source of the emails) has been infected with a malicious computer element 24 (e.g., a computer worm) possibly causing the user system 12 to send emails with fake sender information.

At step 208, an appropriate action may be determined in response to a determination of the source of the communication. The suitable action may include any action, according to particular needs. For example, the action may include locking the user system 12 that is determined to be the source of the communication off network 16 until it can be determined that user system 12 is no longer infected with the malicious computer element 24. As another example, the user system 12 may not be locked off the network entirely, but may be prevented from sending communications (e.g., emails) over network 16. As another example, the action may include quarantining all communications received by server system 14 from the user system 12. Server system 14 may hold the communications until such time as it can be determined that user system 12 is no longer infected with the malicious computer element 24 or any other suitable time. In certain embodiments, the determination of the appropriate action may be made automatically by a suitable component of server system 14 for example (e.g., analysis application 30). Additionally or alternatively, a user such as a network administrator with access to server system 14 may be involved in the determination.

At step 210, the determined action may be performed. In certain embodiments, the determined action may be performed automatically, without any human intervention. Alternately, the determined action may be performed using any suitable amount of human interaction. In certain embodiments, a suitable action may be performed in response to the detection of a suspicious event at step 204. For example, it may be desirable to perform the suitable action prior to determining whether the suspicious event is actually the result of a malicious computer element 24. As a particular example, if a suspicious event is detected and it is determined that user system 12a is the source of the communication that resulted in the detection of the suspicious event, it may be desirable to quarantine all communications received from user system 12a even prior to determining whether the suspicious event is the result of a malicious computer element 24.

Although a particular method for determining the source of a malicious computer element 24 in a computer network has been described with reference to FIGS. 5 and 6, the present invention contemplates any suitable method for detecting a malicious computer element 24 in a computer network and determining the source of a malicious computer element 24 in a computer network in accordance with the present description. Thus, certain of the steps described with reference to FIGS. 5 and 6 may take place simultaneously and/or in different orders than as shown. Moreover, components of system 10 may use methods with additional steps, fewer steps, and/or different steps, so long as the steps remain appropriate. Furthermore, various steps may be performed automatically, substantially without human intervention.

Although the present invention has been described in several embodiments, diverse changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A method for tagging communications from a user system such that a source of a malicious computer element in a computer network may be determined, the method comprising:
    determining, using one or more processing units, tag information for a user system in the computer network, the tag information physically identifying the user system, the user system being a computer distinct from other computers in the computer network;
    detecting, using the one or more processing units, an attempt to send a communication from the user system; and
    in response to detecting the attempt to send a communication from the user system, attaching, using the one or more processing units, the tag information to the communication prior to sending the communication from the user system;
    the attachment of the tag information to the communication allowing the source of the communication to be determined in response to determining that the communication is associated with a malicious computer element, the source being the user system from which the communication was sent.

2. The method of claim 1, wherein the tag information comprises a network adapter identifier of a network adapter of the user system.

3. The method of claim 2, wherein:
    the network adapter of the user system comprises a network interface card (NIC) of the user system; and
    the network adapter identifier comprises an address of the NIC.

4. The method of claim 3, wherein the address of the NIC comprises one or more of the following:
    a media access control (MAC) address of the NIC; and
    an Ethernet card address of the NIC.

5. The method of claim 1, wherein the tag information comprises one or more of the following:
    a company asset identifier of the user system;
    a company asset identifier of a component of the user system;
    a current login user name of a user of the user system;
    a date and time stamp that is attached independent of a date and time stamp attached by a communication program by which the communication is sent; and
    an anti-virus status of the user system.

6. The method of claim 1, comprising attaching the tag information to the communication by adding the tag information to a header of the communication.

7. The method of claim 1, comprising monitoring simple network transfer protocol (SMTP) traffic of the user system for communications to detect the attempt to send the communication, the detected attempt to send the communication being a part of the SMTP traffic.

8. The method of claim 1, wherein the communication comprises one or more of:
an email; and
a structured query language (SQL) call.

9. The method of claim 1, wherein the malicious computer element comprises one or more of the following:
a computer worm;
a computer virus; and
a Trojan horse.

10. The method of claim 1, wherein:
the communication comprises an email;
the malicious computer element comprises a computer worm; and
the tag information allows a server computer to determine, in response to determining that a computer worm is associated with the email, the source of the computer worm based on the tag information attached to the email.

11. The method of claim 1, wherein the tag information attached to the communication allows the source of the communication to be determined independent of information attached to the communication by a communication program for sending the communication.

12. A system for tagging communications from a user system such that a source of a malicious computer element in a computer network may be determined, the system comprising:
one or more memory units; and
one or more processing units operable to:
determine tag information for a user system in the computer network, the tag information physically identifying the user system, the user system being a computer distinct from other computers in the computer network;
detect an attempt to send a communication from the user system; and
in response to detecting the attempt to send a communication from the user system, attach the tag information to the communication prior to sending the communication from the user system;
the attachment of the tag information to the communication allowing the source of the communication to be determined in response to determining that the communication is associated with a malicious computer element, the source being the user system from which the communication was sent.

13. The system of claim 12, wherein the tag information comprises a network adapter identifier of a network adapter of the user system.

14. The system of claim 13, wherein:
the network adapter of the user system comprises a network interface card (NIC) of the user system; and
the network adapter identifier comprises an address of the NIC.

15. The system of claim 14, wherein the address of the NIC comprises one or more of the following:
a media access control (MAC) address of the NIC; and
an Ethernet card address of the NIC.

16. The system of claim 12, wherein the tag information comprises one or more of the following:
a company asset identifier of the user system;
a company asset identifier of a component of the user system;
a current login user name of a user of the user system;
a date and time stamp that is attached independent of a date and time stamp attached by a communication program by which the communication is sent; and
an anti-virus status of the user system.

17. The system of claim 12, wherein the tagging module is operable to attach the tag information to the communication by adding the tag information to a header of the communication.

18. The system of claim 12, wherein the tagging module is operable to monitor simple network transfer protocol (SMTP) traffic of the user system for communications to detect the attempt to send the communication, the detected attempt to send the communication being a part of the SMTP traffic.

19. The system of claim 12, wherein the communication comprises one or more of:
an email; and
a structured query language (SQL) call.

20. The system of claim 12, wherein the malicious computer element comprises one or more of the following:
a computer worm;
a computer virus; and
a Trojan horse.

21. The system of claim 12, wherein:
the communication comprises an email;
the malicious computer element comprises a computer worm; and
the tag information allows a server computer to determine, in response to determining that a computer worm is associated with the email, the source of the computer worm based on the tag information attached to the email.

22. The system of claim 12, wherein the tag information attached to the communication allows the source of the communication to be determined independent of information attached to the communication by a communication program for sending the communication.

23. Software for tagging communications from a user system such that a source of a malicious computer element in a computer network may be determined, the software being embodied in a non-transitory computer-readable medium and when executed operable to:
determine tag information for a user system in the computer network, the tag information physically identifying the user system, the user system being a computer distinct from other computers in the computer network;
detect an attempt to send a communication from the user system; and
in response to detecting the attempt to send a communication from the user system, attach the tag information to the communication prior to sending the communication from the user system;
the attachment of the tag information to the communication allowing the source of the communication to be determined in response to determining that the communication is associated with a malicious computer element, the source comprising the user system being the user system from which the communication was sent.

24. The software of claim 23, wherein the tag information comprises a network adapter identifier of a network adapter of the user system.

25. The software of claim 24, wherein:
the network adapter of the user system comprises a network interface card (NIC) of the user system; and
the network adapter identifier comprises an address of the NIC.

26. The software of claim 25, wherein the address of the NIC comprises one or more of the following:

a media access control (MAC) address of the NIC; and
an Ethernet card address of the NIC.

27. The software of claim 23, wherein the tag information comprises one or more of the following:
a company asset identifier of the user system;
a company asset identifier of a component of the user system; a current login user name of a user of the user system;
a date and time stamp that is attached independent of a date and time stamp attached by a communication program by which the communication is sent; and
an anti-virus status of the user system.

28. The software of claim 23, operable to attach the tag information to the communication by adding the tag information to a header of the communication.

29. The software of claim 23, operable to monitor simple network transfer protocol (SMTP) traffic of the user system for communications to detect the attempt to send the communication, the detected attempt to send the communication being a part of the SMTP traffic.

30. The software of claim 23, wherein the communication comprises one or more of:
an email; and
a structured query language (SQL) call.

31. The software of claim 23, wherein the malicious computer element comprises one or more of the following:
a computer worm;
a computer virus; and
a Trojan horse.

32. The software of claim 23, wherein:
the communication comprises an email;
the malicious computer element comprises a computer worm; and
the tag information allows a server computer to determine, in response to determining that a computer worm is associated with the email, the source of the computer worm based on the tag information attached to the email.

33. The software of claim 23, wherein the tag information attached to the communication allows the source of the communication to be determined independent of information attached to the communication by a communication program for sending the communication.

34. A method for determining a source of a computer worm in a computer network, comprising:
monitoring email traffic on a user system in the computer network for attempts to send emails from the user system;
determining tag information for the user system, the tag information physically identifying the user system and comprising an address of a network interface card (NIC) of the user system; and
in response to detecting an attempt to send an email from the user system, attaching the tag information to the email prior to sending the email from the user system;
the attachment of the tag information to the email allowing the source of the email to be determined in response to determining that the communication is associated with a malicious computer element, the source comprising the user system.

35. A method for determining a source of a malicious computer element in a computer network, comprising:
receiving, using one or more processing units, a plurality of communications each comprising tag information, the tag information for a communication physically identifying a source of the communication, the source of the communication being a user system from which the communication originated, the user system being a computer distinct from other computers in a computer network;
determining, using the one or more processing units and based on one or more of the received communications, that a suspicious event has occurred;
determining, using the one or more processing units, a communication associated with the suspicious event; and
accessing, using the one or more processing units, the tag information for the communication associated with the suspicious event to determine the source of the communication.

36. The method of claim 35, further comprising storing each of the plurality of received communications and their associated tag information.

37. The method of claim 35, wherein the suspicious event comprises a communication that identifies more than a threshold number of recipient addresses.

38. The method of claim 35, wherein the suspicious event comprises a particular communication being sent from a particular user system and specifying multiple sender addresses.

39. The method of claim 35, wherein determining that the suspicious event has occurred comprises determining, based on the tag information, that a threshold number of communications have been sent from a particular user system within a predetermined period of time.

40. The method of the claim 35, further comprising determining, based on the suspicious event, whether the communication is associated with a malicious computer element.

41. The method of claim 35, wherein the suspicious event indicates that the user system that is the source of a communication associated with the suspicious event is infected with a malicious computer element.

42. The method of claim 41, wherein the malicious computer element comprises one or more of
a computer worm;
a computer virus; and
a Trojan horse.

43. The method of claim 35, further comprising, in response to determining that a particular user system is the source of a malicious computer element, locking the particular user system off the computer network.

44. The method of claim 35, further comprising, in response to determining that a particular user system is the source of a malicious computer element, quarantining all communications sent from the particular user system.

45. The method of claim 35, wherein the tag information was attached to the communication at the source of the communication.

46. The method of claim 35, wherein the communication comprises one or more of
an email; and
a structured query language (SQL) call.

47. The method of claim 35, wherein the tag information for a communication comprises a network adapter identifier of a network adapter of the user system that is the source of the communication.

48. The method of claim 47, wherein: the network adapter of the user system comprises a network interface card (NIC) of the user system; and
the network adapter identifier comprises an address of the NIC.

49. The method of claim 48, wherein the address of the NIC comprises one or more of the following:
a media access control (MAC) address of the NIC; and
an Ethernet card address of the NIC.

50. The method of claim 35, wherein the tag information comprises one or more of the following:
- a company asset identifier of the user system;
- a company asset identifier of a component of the user system;
- a current login user name of a user of the user system;
- a date and time stamp that is attached independent of a date and time stamp attached by a communication program by which the communication is sent; and
- an anti-virus status of the user system.

51. The method of claim 35, wherein the tag information for the communication associated with the suspicious event allows the source of the communication to be determined independent of information attached to the communication by a communication program for sending the communication.

52. A system for determining a source of a malicious computer element in a computer network, the system comprising a computer system comprising one or more memory units and one or more processing units, the one or more processing units operable to:
- receive a plurality of communications each comprising tag information, the tag information for a communication physically identifying a source of the communication, the source of the communication being a user system from which the communication originated, the user system being a computer distinct from other computers in a computer network;
- determine, based on one or more of the received communications, that a suspicious event has occurred;
- determine a communication associated with the suspicious event; and
- access the tag information for the communication associated with the suspicious event to determine the source of the communication.

53. The system of claim 52, wherein the one or more processing units are operable to store each of the plurality of received communications and their associated tag information.

54. The system of claim 52, wherein the suspicious event comprises a communication that identifies more than a threshold number of recipient addresses.

55. The system of claim 52, wherein the suspicious event comprises a particular communication being sent from a particular user system and specifying multiple sender addresses.

56. The system of claim 52, wherein the one or more processing units determine that the suspicious event has occurred by determining, based on the tag information, that a threshold number of communications have been sent from a particular user system within a predetermined period of time.

57. The system of the claim 52, wherein the one or more processing units are further operable to determine, based on the suspicious event, whether the communication is associated with a malicious computer element.

58. The system of claim 52, wherein the suspicious event indicates that the user system that is the source of a communication associated with the suspicious event is infected with a malicious computer element.

59. The system of claim 58, wherein the malicious computer element comprises one or more of:
- a computer worm;
- a computer virus; and
- a Trojan horse.

60. The system of claim 52, wherein the one or more processing units are further operable to, in response to determining that a particular user system is the source of a malicious computer element, lock the particular user system off the computer network.

61. The system of claim 52, wherein the one or more processing units are further operable to, in response to determining that a particular user system is the source of a malicious computer element, quarantine all communications sent from the particular user system.

62. The system of claim 52, wherein the tag information was attached to the communication at the source of the communication.

63. The system of claim 52, wherein the communication comprises one or more of
- an email; and
- a structured query language (SQL) call.

64. The system of claim 52, wherein the tag information for a communication comprises a network adapter identifier of a network adapter of the user system that is the source of the communication.

65. The system of claim 64, wherein:
- the network adapter of the user system comprises a network interface card (NIC) of the user system; and
- the network adapter identifier comprises an address of the NIC.

66. The system of claim 65, wherein the address of the NIC comprises one or more of the following:
- a media access control (MAC) address of the NIC; and
- an Ethernet card address of the NIC.

67. The system of claim 52, wherein the tag information comprises one or more of the following:
- a company asset identifier of the user system;
- a company asset identifier of a component of the user system;
- a current login user name of a user of the user system;
- a date and time stamp that is attached independent of a date and time stamp attached by a communication program by which the communication is sent; and
- an anti-virus status of the user system.

68. The system of claim 52, wherein the tag information for the communication associated with the suspicious event allows the source of the communication to be determined independent of information attached to the communication by a communication program for sending the communication.

69. Software for determining a source of a malicious computer element in a computer network, the software being embodied in a non-transitory computer-readable medium and when executed operable to:
- receive a plurality of communications each comprising tag information, the tag information for a communication physically identifying a source of the communication, the source of the communication being a user system from which the communication originated, the user system being a computer distinct from other computers in a computer network;
- determine, based on one or more of the received communications, that a suspicious event has occurred;
- determine a communication associated with the suspicious event; and
- access the tag information for the communication associated with the suspicious event to determine the source of the communication.

70. The software of claim 69, further operable to store each of the plurality of received communications and their associated tag information.

71. The software of claim 69, wherein the suspicious event comprises a communication that identifies more than a threshold number of recipient addresses.

72. The software of claim 69, wherein the suspicious event comprises a particular communication being sent from a particular user system and specifying multiple sender addresses.

73. The software of claim 69, operable to determine that the suspicious event has occurred by determining, based on the tag information, that a threshold number of communications have been sent from a particular user system within a predetermined period of time.

74. The software of claim 69, further operable to determine, based on the suspicious event, whether the communication is associated with a malicious computer element.

75. The software of claim 69, wherein the suspicious event indicates that the user system that is the source of a communication associated with the suspicious event is infected with a malicious computer element.

76. The software of claim 75, wherein the malicious computer element comprises one or more of
   a computer worm;
   a computer virus; and
   a Trojan horse.

77. The software of claim 69, further operable to, in response to determining that a particular user system is the source of a malicious computer element, lock the particular user system off the computer network.

78. The software of claim 69, further operable to, in response to determining that a particular user system is the source of a malicious computer element, quarantine all communications sent from the particular user system.

79. The software of claim 69, wherein the tag information was attached to the communication at the source of the communication.

80. The software of claim 69, wherein the communication comprises one or more of:
   an email; and
   a structured query language (SQL) call.

81. The software of claim 69, wherein the tag information for a communication comprises a network adapter identifier of a network adapter of the user system that is the source of the communication.

82. The software of claim 81, wherein: the network adapter of the user system comprises a network interface card (NIC) of the user system; and
   the network adapter identifier comprises an address of the NIC.

83. The software of claim 82, wherein the address of the NIC comprises one or more of the following:
   a media access control (MAC) address of the NIC; and
   an Ethernet card address of the NIC.

84. The software of claim 69, wherein the tag information comprises one or more of the following:
   a company asset identifier of the user system;
   a company asset identifier of a component of the user system;
   a current login user name of a user of the user system;
   a date and time stamp that is attached independent of a date and time stamp attached by a communication program by which the communication is sent; and
   an anti-virus status of the user system.

85. The software of claim 69, wherein the tag information for the communication associated with the suspicious event allows the source of the communication to be determined independent of information attached to the communication by a communication program for sending the communication.

86. A method for determining a source of a computer worm in a computer network, comprising:
   receiving a plurality of emails each comprising tag information, the tag information for an email physically identifying a source of the email, the source of the email comprising a user system from which the email originated;
   determining, based on one or more of the received emails, that a suspicious event has occurred;
   determining an email associated with the suspicious event; and
   accessing the tag information for the communication associated with the suspicious event to determine the source of the communication.

\* \* \* \* \*